United States Patent [19]

Cheng et al.

[11] Patent Number: 5,893,318
[45] Date of Patent: Apr. 13, 1999

[54] BALL BEARING PISTON AND LINER

[76] Inventors: Chi Cheng; Akimi C. Cheng, both of 391 Western Ave., Clarendon Hills, Ill. 60514

[21] Appl. No.: 08/626,802

[22] Filed: Apr. 3, 1996

[51] Int. Cl.⁶ ..................................... F16J 1/02
[52] U.S. Cl. ........................... 92/169.1; 92/178
[58] Field of Search .................. 92/169.1, 178, 92/192

[56] References Cited

U.S. PATENT DOCUMENTS

| | | | |
|---|---|---|---|
| 2,201,739 | 5/1940 | Nicholson | 92/178 |
| 2,971,802 | 2/1961 | Kennemer et al. | 92/169.1 |
| 3,327,593 | 6/1967 | Ciaccia | 92/178 |
| 5,437,220 | 8/1995 | Cheng et al. | 92/178 |

FOREIGN PATENT DOCUMENTS 1142819  3/1983  Canada ........................ 92/192

Primary Examiner—F. Daniel Lopez

[57] ABSTRACT

This invention relates to a piston with skirt being formed by four sets of bearing grooves as the main structure, and a cylinder liner with four ball bearing rolling tracks. The bearing groove is in doughnut shape and has a circular cross-section to hold the ball bearing in circulation during the reciprocating motion of the piston. Two lines of ball bearings on each side of a piston pin are in line contact to the bearing tracks of the cylinder liner and share the piston thrust load. Lubrication of the ball bearings is ensured by oil slots through the piston head under the oil ring groove to the exposed ball bearings in rolling contact and to the top of the bearing groove.

11 Claims, 2 Drawing Sheets

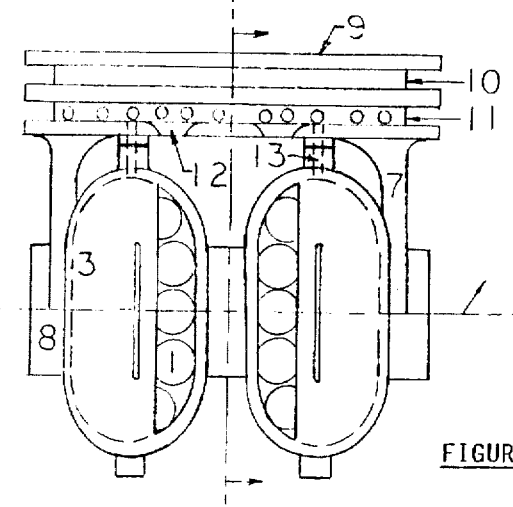
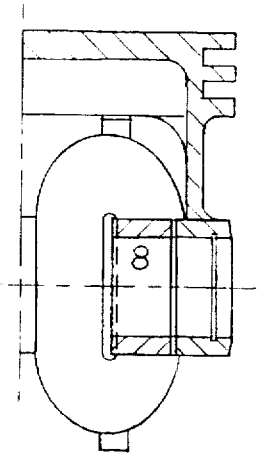
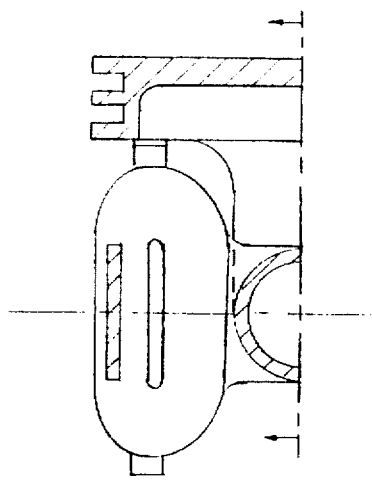
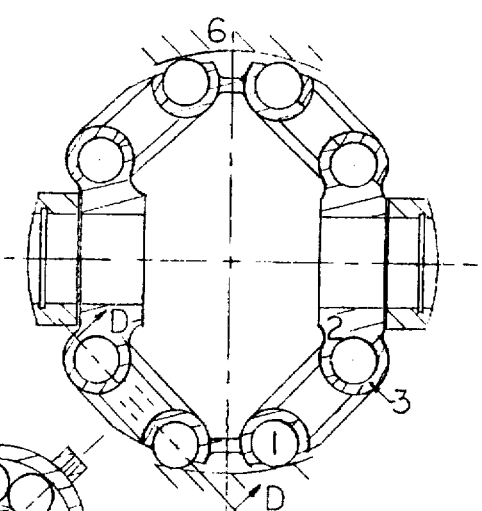
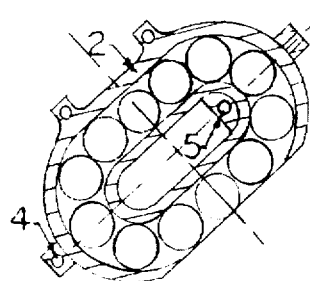

FIGURE 6
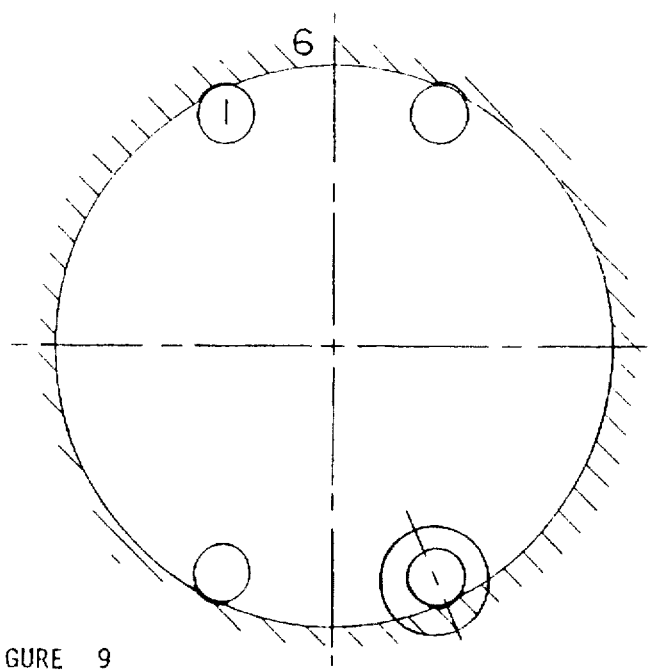
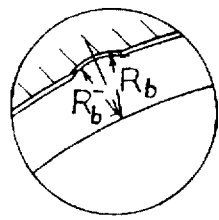 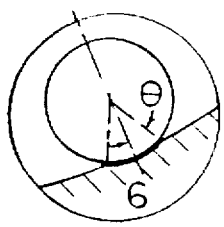
FIGURE 9
FIGURE 7
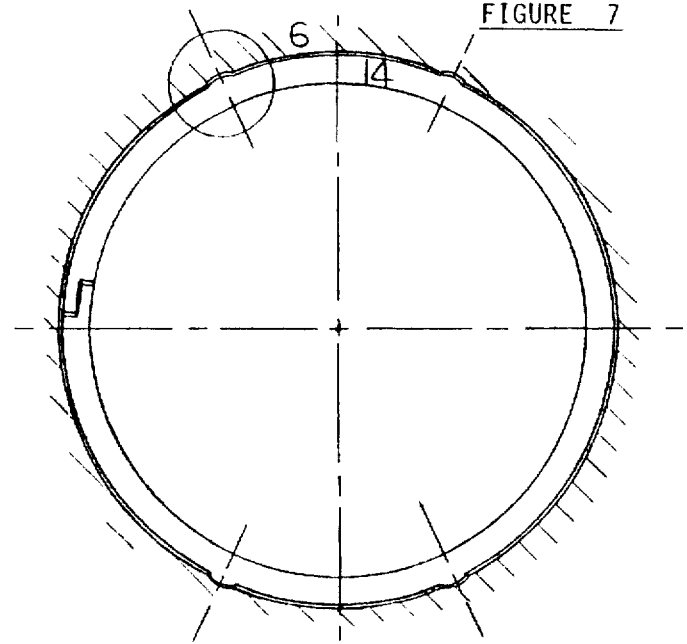
FIGURE 8

BALL BEARING PISTON AND LINER

BACKGROUND OF THE INVENTION

The conventional internal combustion engine has a high frictional, reciprocating piston due to the boundary lubrication. Our previous design in U.S. Pat. No. 5,437,220 inserts four sets of bearing grooves and recirculating ball bearings in the piston skirt to convert its sliding motion into the rotation of ball bearing and to reduce the frictional energy loss at the piston rings and skirt. However, the ball bearing piston is a modification from a conventional piston and is penalized for its obsolete piston skirt. It is hard to keep the weight light, and the assembly may create problem due to the difference in thermal expansion between the steel bearing groove and the aluminum piston skirt.

One natural way to solve these problems is to create a two piece piston with steel bearing grooves as the main piston skirt, and an original aluminum piston head. While the head retains part of the conventional skirt to hold on the piston pin, the new bearing groove structure rides on two steel rings over the piston pin independently. It provides the least weight and separates the steel bearing groove from the deleted aluminum piston skirt support.

Also, the previous design uses a compatible, hardened cylinder liner for the ball bearing to run. Although there are many balls to share the piston load, each ball has a small contact area which is just better than the point contact, and the contact stress will be high. A solution is to mill the cylinder liner to provide four lines of bearing track. These receded tracks have ball radius curvature and will enlarge the contact area against the ball bearing but minimize the extra blow-by.

1. Field of the Invention

This invention relates to the field of anti-friction piston and cylinder liner. The reduction of friction has achieved through a piston with rollers in the skirt, a two piece piston with cylindrical barrel rollers or a piston with recirculating ball bearings in our previous design.

2. Description of the Prior Art

Most of the prior patents utilized the rollers in the piston skirt or in the cylindrical barrel to withstand the piston thrust load under the peak firing pressure of the engine. Our previous patent uses numerous recirculating ball bearings. They all convert the sliding motion of a piston into the rotating motion.

U.S. Pat. No. 4,704,949, Piston, to John D. Foster in 1987 uses two sets of three roller bearings mounted on a light weight piston skirt. The load carrying capacity of three axles and rollers will limit the maximum allowable thrust load of the piston and the engine horsepower.

Our previous U.S. Pat. No. 5,437,220, Ball Bearing Piston in 1995 has the piston skirt milled to locate four sets of bearing grooves and recirculating ball bearings. The weight of piston will be increased and becomes a problem. The difference of thermal expansion of the aluminum piston skirt and steel bearing grooves creates concern or problem in the assembly. Also, the bearing groove serves perfectly as a ball bearing inner race. But the hardened cylinder liner has a mismatch curvature or nearly a point contact to the ball bearing. These concerns will limit the application.

In order to design a light weight ball bearing piston the bearing grooves become the main piston skirt structure. Two piece piston and modification on the cylinder liner are introduced to improve the ball bearing piston.

SUMMARY OF THE INVENTION

This invention is to improve the ball bearing piston in our previous design. Its main purpose is still to convert the sliding motion into the rotating motion of the recirculating ball bearings. However, we make some improvements to enhance its functions in bearing load capacity, weight reduction ability to carry all the piston thrust load in hot and cold engine condition and ease in bearing groove assembly.

First, four base grooves are connected to two rings which hold on the inner part of piston pin by ribs. Also, there are ribs to connect the two adjacent bearing grooves on both the thrust and anti-thrust sides. Together, they form the thrust load carrying structure and replace most of the original piston skirt. This new skirt is steel in material, and uses near shape casting to minimize the machining requirement and to reduce the piston weight. The piston head retains part of the piston skirt over the piston pin and rides on the pin by two rings at the outer sections. This allow the piston to have an independent piston head. For weight reduction, aluminum alloy is used. In general, a two piece ball bearing piston with bearing groove as the main piston skirt structure has been designed. It eliminates the aluminum support for the steel base bearing groove in the previous design and simplifies its assembly. As a result, piston with least weight increase has been designed.

To assure that the ball bearings will always carry the piston thrust load in both the hot and cold engine conditions, all piston ring grooves have been cut deeper to avoid the ring bottoming sideward against the back of groove. However, it is important to maintain the tight clearance between the exposed ball bearing and the cylinder liner on both thrust and anti-thrust sides such that the piston tilting and slapping can be much reduced.

For the load carrying capacity and its life, the bearing groove serves very well as an inner race to the circulating ball bearing. To enlarge the contact of ball against the cylinder liner, four lines of dented track have been milled with curvature of ball radius. For a 3" diameter bore, and 0.25" ball bearing, a recess of 0.004" will create a line contact over an arc of 30° on the ball. It modifies the cylinder liner to become an outer race for the circulating ball bearing of the piston. These tracks will start under the top ring location such that the extra blow by is small and negligible. For larger recess and longer line contact between ball and liner, an odd piston ring with four bumps will be used to seal the extra recess. Whether the odd shape piston ring is required, it will be judged from the contact stress and ball bearing/cylinder liner life. For the current automotive engines with 500 psi peak firing pressure, a recess of 0.004" is good enough to reduce the contact stress by a magnitude of 3, and provides long enduring life for the hardened cylinder liner and ball bearings in contact. The hardened cylinder liner is a through hardened cylinder liner, which includes an inner surface that is hardened and a substrate that is hardened.

Similarly, for the lubrication of these rolling balls, the oil ring groove of the piston head has the same four openings aligned over the four exposed ball bearings to distribute oil in the path of travel of the ball bearings. The bearing groove structure has protrusions over their top which are nearly in contact to the aluminum piston head. It provides the structure support to the piston head when engine is hot and the small clearance between the bottom of piston head and the top of bearing groove disappears due to the difference of thermal expansion between steel and aluminum. Around the top of bearing groove, there are oil hole paths to supply oil to the bearing groove to ensure the lubrication of the ball bearings.

BRIEF DESCRIPTION OF THE DRAWINGS

FIG. 1 is the front view of the two piece ball bearing piston.

FIG. 2 is the schematic view of the cross-section 1—1 on the vertical plane which is perpendicular to the piston pin center line.

FIG. 3 is half of the symmetric, schematic view of the cross-section 2—2 on the vertical plane across the piston pin center line.

FIG. 4 is the schematic view of the cross-section 3—3 on the horizontal plane across the piston pin center line.

FIG. 5 is the schematic view of the cross-section 4—4 of the base bearing groove.

FIG. 6 is the schematic view of the cylinder liner with four dented ball bearing tracks and four lines of ball bearings of the piston.

FIG. 7 is the enlarged view of the ball bearing and the bearing track of the cylinder liner.

FIG. 8 is the horizontal cross-sectional view of the cylinder liner with four bearing tracks and the compatible piston ring with four bumps.

FIG. 9 is the enlarged view of the bearing track of the cylinder liner and the piston ring with bump to seal.

DETAIL DESCRIPTION

The ball bearing piston in FIG. 1 has an aluminum piston head, #9, and an independent steel bearing groove-skirt, #7. For convenience, a flat piston head and two piston ring grooves are shown. The piston head may have different bowl shape, one to three compression ring grooves, #10, and one oil ring groove, #11. The number of compression rings and ring grooves depends on the engine's firing pressure and power rating. All the ring grooves are cut deeper such that the piston ring will never be in contact to the back of the ring groove, and two lines of the exposed ball bearing on either the thrust or anti-thrust side will always carry all the piston thrust load. The piston retains part of the conventional skirt wall for its head to hold on the outer sections of the piston pin. The independent piston skirt is steel in material and has its own cylindrical openings, #8, to hold on the inner sections of the piston pin.

FIGS. 2 to 4 shows the cross-sectional views of the piston along, being perpendicular to and across the piston pin axis. In FIG. 4, the basic structure of the piston skirt mainly consists of four bearing grooves, #2 and #3, and two cylindrical rings, #8. The bearing grooves are symmetrically distributed on both sides of the piston pin. Each bearing groove has one base and one cover pads with half a circle cross-section for the ball bearing circulation. The cover are partial, and two lines of ball bearing are exposed on both the thrust and anti-thrust sides to carry the piston thrust load. These bearing grooves are connected to two cylindrical ring sections, #8, by ribs. Also, on both sides of the piston pin, two adjacent bearing grooves are joined together by steel ribs for structure rigidity. FIG. 5 shows the geometry of the base bearing groove through the vertical cross-sectional view.

These bearing grooves and ribs will have their thickness and size optimized through the finite element analysis under the peak piston thrust load and/or the peak firing pressure. For the manufacture, the whole structure uses near shape casting, has its cylindrical ring sections drilled to locate the piston pin, and then has its bearing groove tracking surface rough machined, heat treated for surface hardness and finish milled for bearing surface finish. Screws and pins, #4 and #5, are used to fasten and locate the cover bearing groove pad, #3, over the base bearing groove, #2.

For lubrication of the ball bearing, FIGS. 1 and 5 show the design. Four slots, #12, are cut on the oil ring groove of the piston head to provide oil in line to the exposed ball bearings. In addition, four oil hole slots inside the piston head with an enlarged trap entrance and the top of bearing groove pads, #13, will also supply oil to ensure full lubrication for the rolling contact.

FIG. 6 shows a schematic horizontal cross-sectional view of a cylinder liner with four ball bearing rolling tracks, and four lines of ball bearing of the piston. For the load carrying capacity of ball bearing and the endurance life of the ball bearing and cylinder liner, four vertical bearing tracks have been milled with a curvature of ball radius in the horizontal direction. The depth of these bearing tracks is kept to a minimum around 0.004 in to provide a line contact over an arc more than 30° or around on the bearing ball. FIG. 7 shows such a bearing track of the cylinder liner and the ball bearing in line contact in an enlarged view.

The length of the bearing track of the cylinder liner will just cover the traveling distance of the exposed ball bearing of the piston. At the top, it reaches the top exposed ball in contact to the liner at TDC (top dead center), and is below the top ring location by a short distance. Within this distance, piston rings can seal against the peak firing pressure. For piston ring to travel across the bearing tracks, the firing pressure gets lower, and the recess and leakage are small. The extra blow-by will be negligible.

In high BMEP engine, the firing pressure and the peak piston thrust load is high. For application with short piston, high bearing capacity is required. The contact arc needs to be increased to be around 60° on the ball bearing of the piston. The recess of the bearing track of the cylinder liner will be relatively large and must be sealed to improve the blow-by and engine efficiency. FIG. 8 shows the special piston ring, #14, with four bumps to seal against these bearing tracks. In this application, the length of bearing track is longer and reaches the top ring location. The bump on the piston ring has a curvature with a ball radius, $R_b$, to seal. For manufacture and assembly, this radius, $R_b^-$, is a little smaller than the actual ball radius, $R_b$. FIG. 9 shows the enlarged view of the bearing track of the cylinder liner and the piston ring with bump to seal.

Although preferred designs of the invention have been illustrated and described herein, this invention is intended to encompass any rearrangements, modification and substitution of the parts, elements and material as fall within the spirit of the appended claims.

We claim:

1. An anti-friction piston and a cylinder liner for use in an internal combustion engine or pump for reciprocating motion comprising:

a piston head of circular cross-section with either a bowl disposed therein or a flat head, two to four ring grooves disposed around an outer periphery thereof;

a piston skirt selected from the group consisting of a one-piece integral piston/skirt combination and two-piece articulated piston with a detachable skirt portion;

four sets of bearing grooves and four sets of a plurality of ball bearings received in said groove, said grooves and bearings being recessed in an outer periphery of said skirt with two sets of said grooves and bearings on each side of a wrist pin, said bearing grooves including a full width base groove portion and a partial width cover groove portion;

a plurality of locating pins and screws securing each of said groove sets and said bearing sets to said skirt; and a cylinder liner with a hardened inner surface, a hardened substrate, and four vertical ball bearing rolling tracks.

2. The piston in claim 1 wherein said skirt uses said four bearing grooves as said skirt's main structure.

3. The piston in claim 1 wherein each of said groove set is in doughnut shape, and contains said base groove having a full width and said cover groove being partial in width.

4. The piston in claim 3 wherein sliding motion of the piston causes rolling motion of said bearings, said rolling motion of said bearings recirculates said bearings around said bearing grooves.

5. The piston in claim 1 wherein a portion of said plurality of ball bearings are disposed in a vertical orientation in contact with said bearing track of said cylinder liner.

6. The piston in claim 1 wherein the bearing grooves are located symmetrical to a center line of the wrist pin in a vertical direction such that thrust loads produced by said piston are evenly distributed over two lines of said bearings.

7. The piston in claim 1 wherein two lines of bearings are formed on each of a thrust side and an anti-thrust side of said piston, said two lines alternatively resist piston thrust and anti-thrust loading.

8. The piston in claim 1 wherein said ring grooves in said head are cut deep enough to prevent a bottoming contact of the piston ring to the back of said ring groove under piston thrust and anti-thrust loading.

9. The cylinder liner in claim 1 wherein said bearing track has a horizontal curvature of said ball bearing of said piston, and provides an arc/line contact for corresponding ball bearings against said bearing track.

10. The cylinder liner in claim 1 wherein said bearing track has a length which covers the traveling distance of said ball bearings of said piston in contact to said cylinder liner.

11. The cylinder liner in claim 1 wherein said bearing track is just wide enough to cover a corresponding ball bearing,in contact therewith, by an arc around 30 to 60 degrees.

* * * * *